Figure 1:
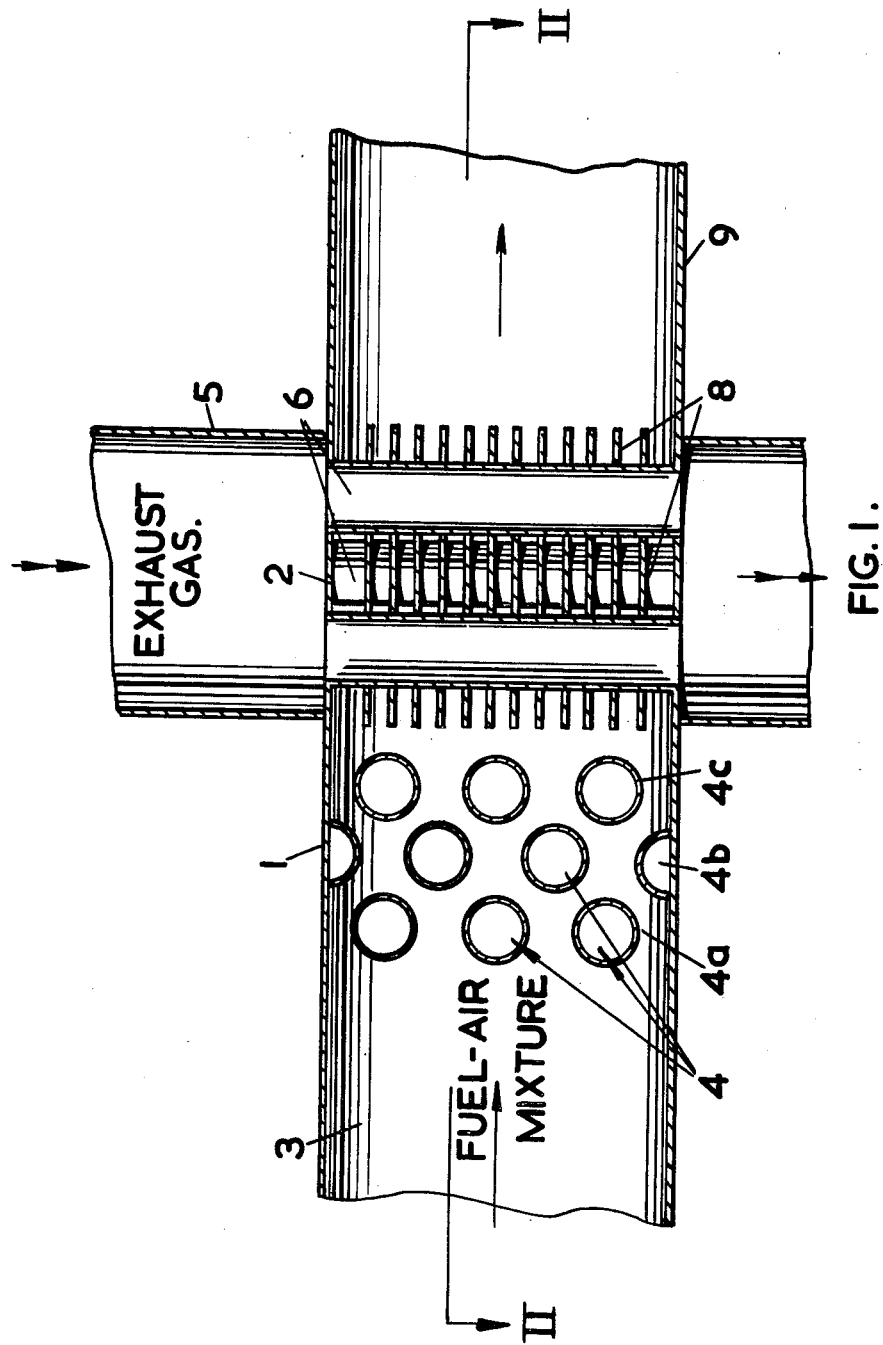

United States Patent [19]

Finlay et al.

[11] 4,167,165
[45] Sep. 11, 1979

[54] FUEL VAPORIZERS FOR INTERNAL COMBUSTION ENGINES

[75] Inventors: Ian C. Finlay; George R. Gallacher, both of Glasgow, Scotland

[73] Assignee: The Secretary of State for Industry in Her Britannic Majesty's Government of the United Kingdom of Great Britain and Northern Ireland, London, England

[21] Appl. No.: 705,890

[22] Filed: Jul. 16, 1976

[30] Foreign Application Priority Data

Jul. 18, 1975 [GB] United Kingdom ............... 30319/75

[51] Int. Cl.$^2$ ............................................. F02M 31/00
[52] U.S. Cl. ............................. 123/122 AA; 261/144; 261/145; 165/52
[58] Field of Search .................... 123/122 AA, 141; 261/145, 144; 48/180 R; 165/52

[56] References Cited

U.S. PATENT DOCUMENTS

| 842,170 | 1/1907 | Bryant | 123/122 AA |
|---|---|---|---|
| 1,124,706 | 1/1915 | Conwell | 123/122 AA |
| 1,133,825 | 3/1915 | Swenson | 123/122 AA |
| 1,269,753 | 6/1918 | Shum | 123/122 AA |
| 1,630,048 | 5/1927 | Balachowsky | 123/122 AA |
| 4,016,847 | 4/1977 | Rychlik | 123/122 AA |
| 4,029,065 | 6/1977 | Wood | 123/122 AA |

FOREIGN PATENT DOCUMENTS 965760 4/1948 France ............................... 123/122 AA Primary Examiner—Ronald H. Lazarus
Attorney, Agent, or Firm—Cameron, Kerkam, Sutton, Stowell & Stowell

[57] ABSTRACT

A self-regulating, fast-response fuel vaporizer is disclosed which is capable of promoting increased efficiency of combustion of the fuel supplied to a spark ignition engine throughout the entire working range of the engine. The vaporizer comprises an inlet conduit through which fuel-air mixture is admissible to the engine, the mixture being directly heated within the conduit by an exhaust conduit which intersects with the inlet conduit. Use is made in the design of the respective heat transfer surfaces, of an inherent effect that flow pulsations have upon heat transference between a gas flowing in a tube and the walls of that tube, to provide a selected inverse relationship between heat transfer coefficient and engine speed whereby automatic regulation may be achieved of the heat supplied to the fuel-air mixture for all engine speeds.

12 Claims, 7 Drawing Figures

FUEL VAPORIZERS FOR INTERNAL COMBUSTION ENGINES

This invention relates to a self-regulating fuel vaporiser suitable for vaporising the liquid fuel fed to the cylinders of a spark ignition, internal combustion engine, the heat required to operate the vaporiser being obtained from the exhaust gases produced by the engine.

It is desirable that all the fuel supplied to an internal combustion engine should be totally consumed in the combustion process, and the more finely divided the fuel is and the more uniformly it is dispersed throughout the input air volume, the more complete the ensuing combustion is likely to be. The fuel-air mixture supplied by conventional carburetors is far from homogeneous with the result that combustion is seldom complete.

A large number of devices have been proposed for improving the homogeneity of the fuel-air mixture supplied to an i.e. engine, many of which rely on using exhaust gas from that engine to heat some or all of the fuel, air or fuel-air mixture to promote vaporisation of the fuel and hence induce better dispersion of the fuel throughout the air volume. Early designs of fuel vaporiser attempted to boil neat fuel and inject the resulting fuel vapour into the induced air flow to the engine. The very high surface temperatures required to vaporise the heavy ends of the fuel led to fuel cracking, and the resulting build up of deposits on the heat transfer surfaces caused the vaporiser to fail. Other designs have involved heating the input air before mixing with the fuel, while later techniques involved the vaporisation of fuel into an air stream.

The principal difficulty associated with all these techniques is that of achieving the required fuel evaporation rate throughout the whole working range of the engine without exposing the fuel-air mixture to heat transfer surfaces which are at unacceptably high temperatures. Generally the hotter the engine and its exhaust gas become, the less thermal coupling is needed between the exhaust gas and the input mixture, and in most prior designs some form of external regulation has been necessary. Such external regulation usually consists of varying the amount of exhaust gas supplied to the heat transfer surface, or of controlling the size of the portion of air, fuel or fuel-air mixture which is heated before being mixed with the unheated remainder of the input mixture. Some self-regulating systems have been proposed, e.g. thermal coupling by means of a non-condensable gas controlled thermosiphon, but such systems tend to be bulky and to have high thermal inertia and consequential slow response.

The present invention seeks to make possible the provision of a fast response, total-fuel vaporising system which is capable of consistent operation throughout the whole working range of a spark ignition engine, the automatic heat transfer control that is essential for the success of such a system being achieved by advantageous use of an inherent effect that flow pulsation has upon heat transference between a gas flowing in a tube and the walls of that tube. Exploratory measurements, made by the present inventors, of heat transfer coefficients in the exhaust manifold of a spark ignition engine have shown that at low engine speeds a large enhancement of the surface heat transfer coefficient occurs due to pulsations in the exhaust gas flow. As engine speed increases the magnitude of this enhancement decreases, and it is this inverse relationship between engine speed and heat transfer coefficient that is selectively used herein in the design of a self-regulating fuel vaporiser.

According to the present invention a self-regulating fuel vaporiser comprises a fuel-air conduit through which fuel-air mixture is admissible a spark-ignition engine; and a heat source provided by an exhaust conduit through which exhaust gases from the said engine are emissable, said exhaust conduit having a heat transfer portion which is arranged to intersect with said fuel-air conduit. A part or the whole of the fuel-air mixture emitted from a standard carburetor may be constrained to flow through the fuel-air conduit before entering the cylinders of the engine.

The heat transfer portion of the exhaust conduit may comprise a plurality of vaporiser tubes which are preferably parallel to one another and perpendicular to an axial plane of said fuel-air conduit. The vaporiser tubes may commonly bear a stack of planar vaporising fins, which fins extend the full width of the conduit and are perpendicular to the vaporiser tubes, i.e. parallel to said axial plane of the conduit. The quantity and dimensions of both the vaporiser tubes and fins, together with the fraction of total exhaust gas which is allowed to flow through the vaporiser tubes may be selected for an engine of specific capacity, to provide optimum matching between heat source and heat sink over a wide range of operating conditions.

To promote even distribution to each fin of the fuel droplets in the fuel-air mixture emerging from the carburetor, the heated vaporiser tubes may be preceded in the fuel-air conduit by pre-mixing means comprising a staggered array of transversely mounted mixer tubes or rods, the axes of which mixer tubes are perpendicular to the axes of the vaporiser tubes and parallel to the planes of the vaporising fins. These mixer tubes, which effectively provide a multi-venturi array, induce good mixing in the longitudinal direction of the vaporiser tubes and hence promote even distribution to the fins. The mixing action also helps to vaporise the volatile components of the fuel and so reduce the risk of boiling in the early stages of the heated fin section. Alternatively, a single venturi may be used in place of the multiple tube array to promote mixing and pre-vaporisation.

The vaporiser tubes themselves are preferably arranged within the conduit in staggered array similar to that of the multiple mixer tubes, in order to promote good mixing in the direction perpendicular to that provided by the mixer tubes or single venturi, thereby promoting even distribution of fuel across the breadth of each vaporiser fin.

Figure 2:
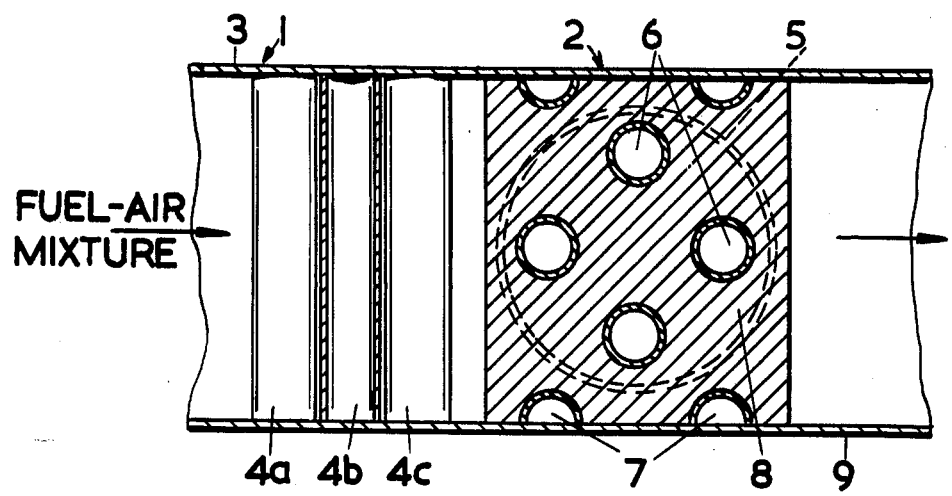
Figure 5:
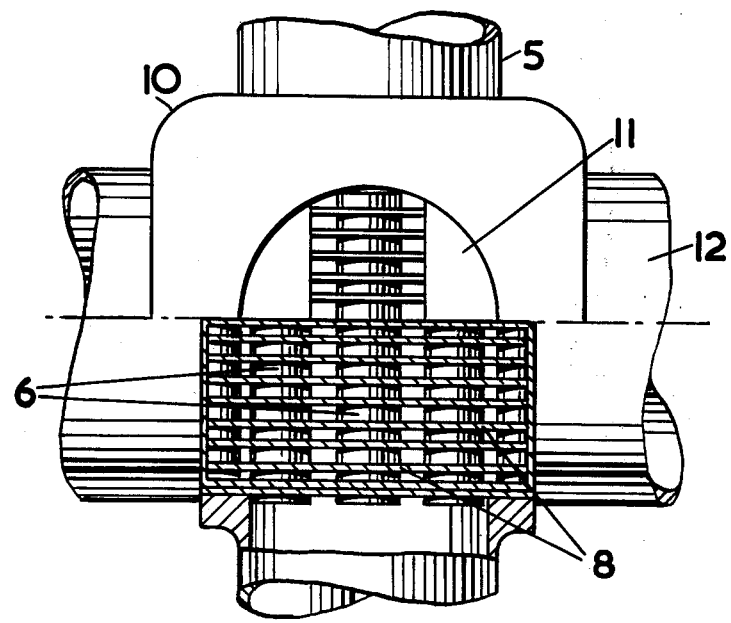
Figure 3:
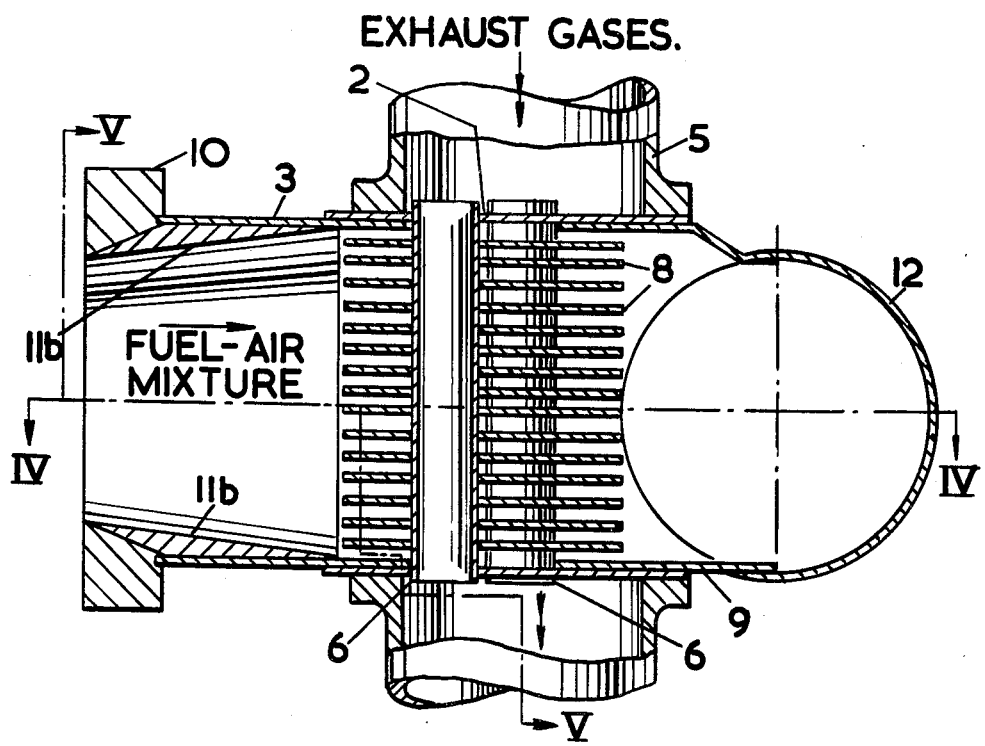
Figure 4:
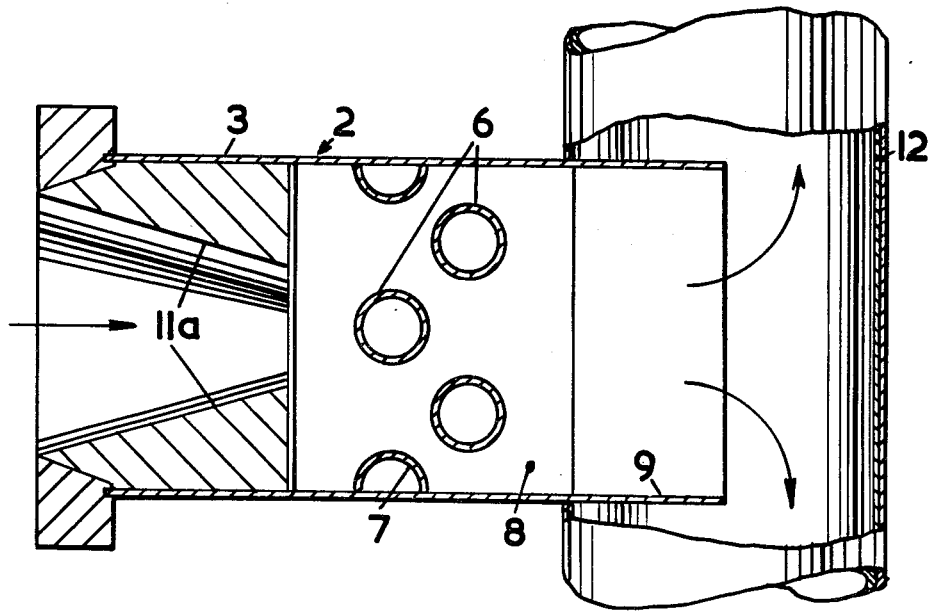
Figure 6:
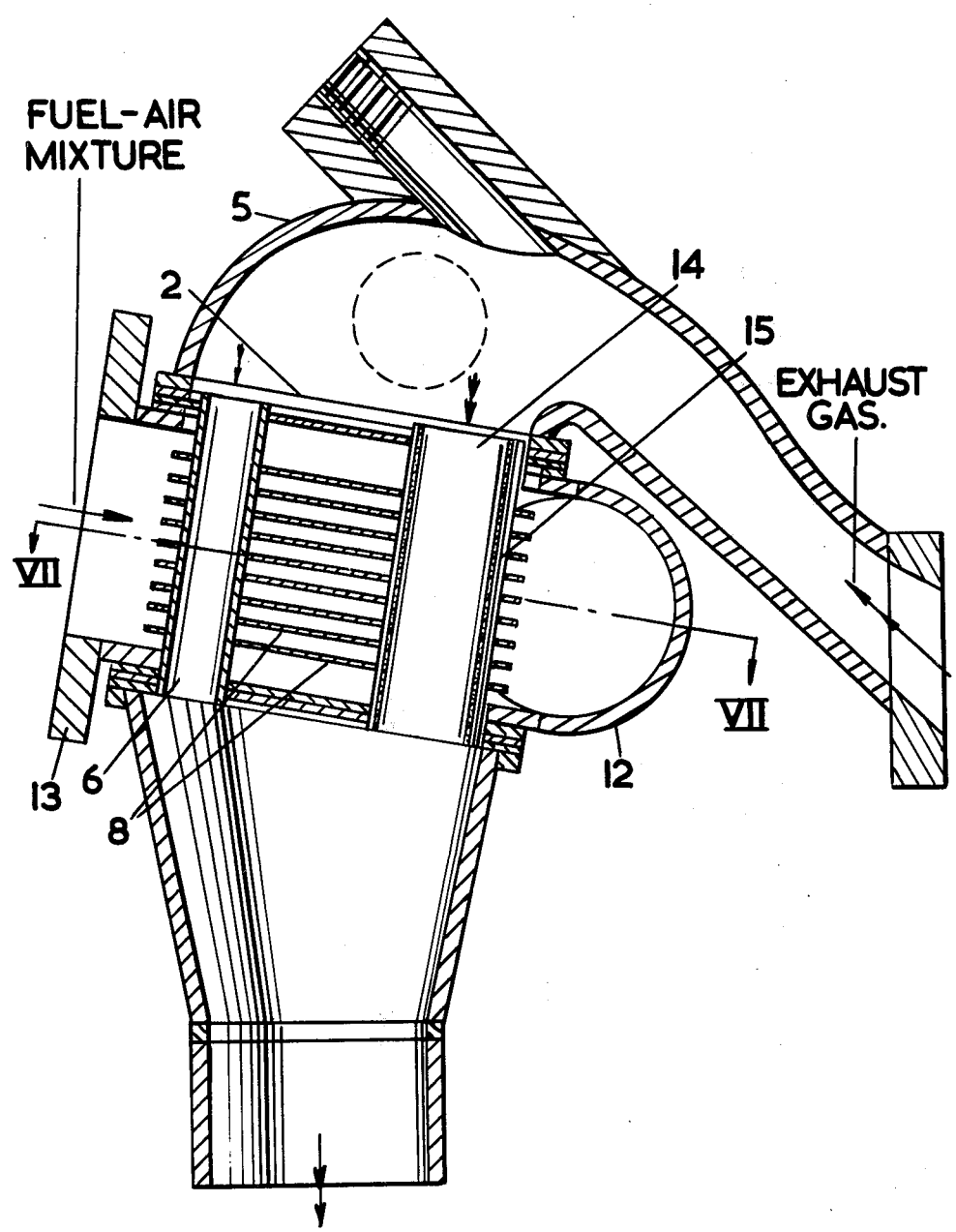
Figure 7:
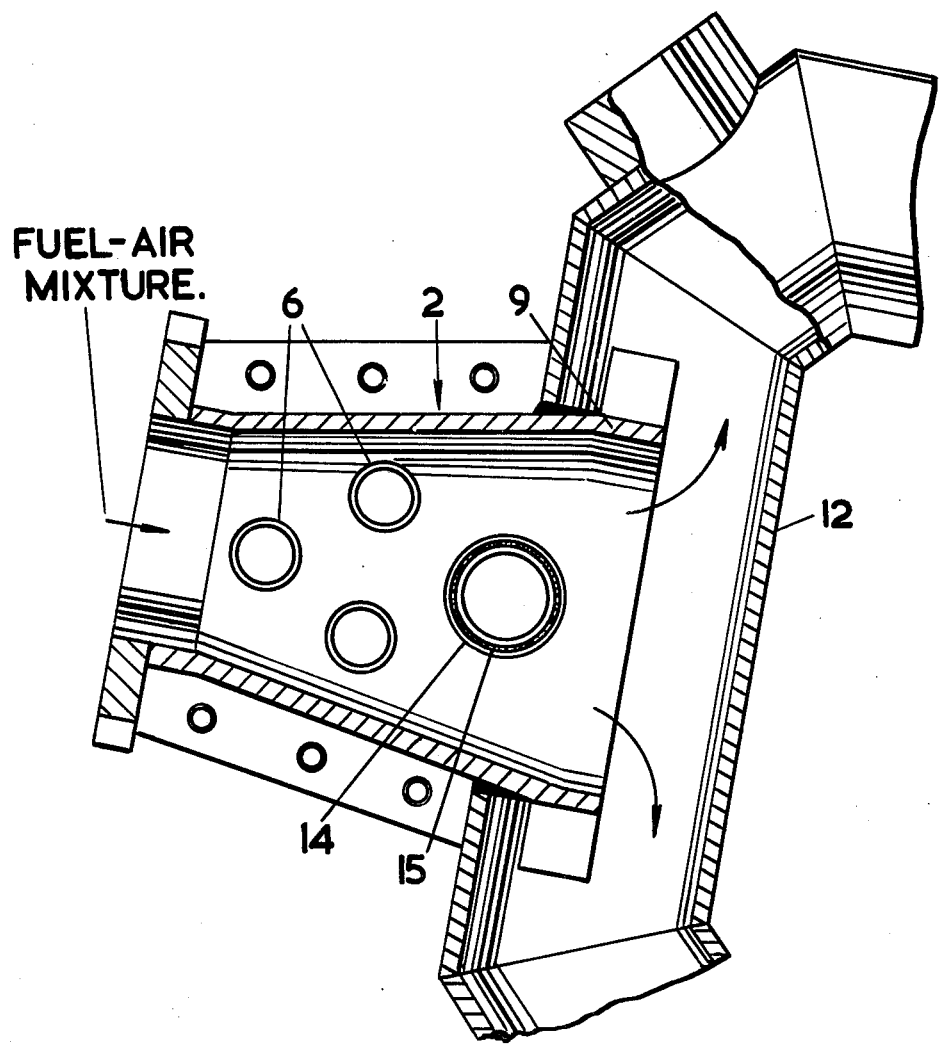

Embodiments of the invention are now described by way of example only, with reference to the accompanying drawings of which FIG. 1 is a sectional drawing of a fuel vaporiser illustrating the invention and having a multiple tube pre-mixer, FIG. 2 is a second sectional drawing of the embodiment illustrated in FIG. 1, taken on line II—II of FIG. 1, FIG. 3 is a sectional drawing of a second fuel vaporiser according to the invention and having a single venturi pre-mixer, FIG. 4 is a second sectional drawing of the embodiment illustrated in FIG. 3, taken on line IV—IV of FIG. 3, FIG. 5 is an end view of the embodiment illustrated in FIGS. 3 and 4, viewed from the fuel-air mixture inlet end and part-sectioned at line V—V of FIG. 3, FIG. 6 is a sectional drawing of a third fuel vaporiser according to the invention and having an integral exhaust gas by-pass tube, and FIG. 7 is a second sectional drawing of the embodiment illustrated in FIG. 6, taken on line VII—VII of FIG. 6.

The fuel vaporiser illustrated in FIGS. 1 and 2 comprises an inlet pipe 3 which is coupled to the outlet of a standard carburetter (not shown), a multiple-tube pre-mixer portion 1, a finned-tube vaporiser portion 2 and an outlet pipe 9, which pipe is connected to the inlet manifold of a spark ignition engine (not shown). The normal fuel-air mixture emerging from the carburetor, is admitted to the inlet pipe 3. Direct flow of the mixture through the pre-mixer portion 1 from left to right as drawn, is disturbed by a staggered array of mixer tubes 4, all parallel to one another and disposed in the form of three consecutive, full width grids 4a, 4b and 4c, which are normal to the axis of the pipe 3. Each tube of every grid is spaced apart from its neighbours by one tube diameter and each succeeding grid is transversely displaced from the preceding grid by one tube diameter such that tubes and spaces alternate in the longitudinal direction of the pipe 3.

The disturbance in the mixture flow caused by the presence of the mixer tubes 4 promotes uniform distribution of the fuel droplets across the full bore of the pipe 3 in the direction perpendicular to the mixer tubes and also induces some preliminary vaporisation of volatile fuel components before entering the vaporiser portion 2.

The mixture then flows into the vaporiser portion 2 which consists of four vaporiser tubes 6, which transversely intersect the bore of the pipe 3 in a direction perpendicular to the mixer tubes 4, and through which exhaust gas from the engine flows via a pipe 5. In addition to their role as vaporising tubes, these four tubes 6, together with four parallel dummy half-tubes 7, through which no exhaust gas flows, are disposed in a staggered arrangement similar to that of the mixer tubes 4, in order to promote mixing of the fuel-air components across the full bore of the pipe 3 in the direction perpendicular to the vaporiser tubes.

The four vaporiser tubes 6 and four half-tubes 7 mutually bear a stack of equally spaced planar vaporising fins 8, each of which fins extends to the side walls of the pipe 3 and is perpendicular to the tubes 6. Each fin 8 is supplied uniformly with fuel as a result of the preceding mixing by the tubes 4 and vaporisation occurs in this region as a result of the heat transferred to the fins from the hot exhaust gas flowing through the tubes 6 via the pipe 5. The resulting homogeneous mixture of air and vaporised fuel then passes out of the vaporiser fins for supply to the cylinders of the spark ignition engine via the outlet pipe 9.

A second embodiment of a fuel vaporiser according to the invention, having a vaporiser portion of similar form to that of the first embodiment in combination with a single venturi pre-mixer portion is illustrated in FIGS. 3, 4 and 5. This embodiment comprises an inlet pipe 3, which may be coupled to the outlet of a standard carburettor (not shown) via a flanged tubular insert constituting an inlet nozzle 10, the internal section of which decreases along its length to provide a venturi; a finned-tube vaporiser portion 2; and an outlet pipe 9 which connects into an inlet manifold 12 of a spark ignition engine (not shown).

The bore of the inlet nozzle 10 smoothly varies along its length from a circular cross-section at the inlet end to a rectangular cross-section at the outlet end adjacent the vaporiser portion 2, to form two opposing side walls 11a which are convergent in the direction of flow, and two opposing side walls 11b which are non-convergent and may be slightly divergent in the direction of flow in order to ensure admission of fuel-air mixture to every one of the vaporising fins of the following vaporiser portion 2.

The flow of fuel air mixture admitted to the inlet nozzle 10 is first accelerated by reason of the converging side walls 11a, thus promoting turbulent flow and hence re-entrainment of fuel droplets that have separated out after emission from the carburettor, the re-entrained droplets being then thrown out of the end of the inlet nozzle 10 at high speed into the abruptly wider interior of the adjoining vaporiser portion 2.

The vaporiser portion 2 comprises a stack of vaporising fins 8 supported upon three vaporiser tubes 6, through which exhaust gas flows via a pipe 5, and upon two dummy half-tubes 7, all respectively arranged to promote uniform distribution of fuel droplets, substantially as described for the first embodiment, the planes of the vaporising fins being perpendicularly orientated with respect to the outlet edges of the two converging sidewalls 11a. Three vaporiser tubes 6 have been found to give acceptable performance in respect of both heat transference and of mixing.

Either one of these embodiments, when fitted to a spark-ignition engine, inherently provides adequate regulation of the thermal coupling between the exhaust gas flow and the fuel-air mixture flow throughout the whole operating range, provided that the parameters governing the thermal coupling within the vaporiser portion are selected to suit the particular engine. Such governing parameters are quantity and dimensions of vaporiser tubes and fins, and fraction of total exhaust gas passed through the vaporiser tubes.

By way of example, a vaporiser of the type illustrated in FIGS. 3, 4 and 5, applied to a 1,800 cc, four cylinder engine of a 1971 Morris Marina road vehicle, has been found to have optimum performance when approximately one quarter of the total exhaust gas from the engine is allowed to pass through the three vaporiser tubes 6 each tube having a bore diameter of 10 mm and all other parts being correspondingly scaled, as described. Any larger fractions of total exhaust gas allowed to flow through vaporiser tubes of this size can result in mixture temperatures and back pressure in the exhaust manifold which are excessive and can lead to the onset of engine knock, increased emission of oxides of nitrogen, and to loss of power.

In this specific application the exhaust gas supply to the vaporiser is conveniently fed from a common outlet pipe of the second and third engine cylinders only, thus ensuring that no more than 50% of the total exhaust gas can reach the vaporiser tubes, and further reduction of gas flow through these tubes is achieved by the provision of an appropriately sized, external by-pass tube. Alternatively, the vaporiser unit itself may be provided with an internal by-pass tube.

A third embodiment of the invention, provided with an internal by-pass tube, is illustrated in FIGS. 6 and 7. This embodiment may be coupled to the outlet of a carburetor (not shown) by means of a flanged inlet tube 13. Fuel-air mixture entering the inlet tube 13 flows directly into a vaporiser portion 2 comprising a stack of vaporising fins 8 supported upon three vaporiser tubes 6 and a by-pass tube 14. The mixture then leaves the vaporiser portion 2 via an outlet pipe 9 which connects with an inlet manifold 12 of a spark ignition engine.

The by-pass tube 14 is double-walled, thereby providing an annular chamber 15 which is packed with thermal insulating material. Exhaust gas is fed from the engine, via a pipe 5, to flow through all three vaporiser tubes 6 and the by-pass tube 14 in parallel. Heat is transferred from the exhaust gas to the fuel-air mixture principally via the vaporiser tubes 6 and attached fins 8, any transference via the by-pass tube 14 being substantially prevented by the insulating material in the surrounding annular chamber 15.

It will be apparent to those skilled in the art that the use of large bore vaporiser tubes would reduce back pressure in the exhaust manifold and may with appropriate dimensioning also sufficiently reduce the heat transfer performance of the tubes and associated fins to eliminate the need for any by-pass tube, either internal or external. Furthermore, when a vaporiser according to the invention is applied to an engine having separately ported cylinders, the need for a by-pass tube may be obviated by employing the exhaust gas from one cylinder only.

The mass of all the heat transfer elements, i.e. vaporiser tubes and fins, of the aforementioned embodiments should preferably be as low as possible to minimise the response time of the device, and fins of approximately 0.25 mm thickness mounted on vaporiser tubes of 0.76 mm wall thickness have been found to give acceptable results with adequate durability. Suitable materials for the vaporiser tubes and fins include copper, copper alloys having high copper content, aluminium and aluminium alloys having high aluminium content. Nickel plating is desirable when copper is used. The fins may be brazed, soldered or mechanically attached to the vaporiser tubes.

It is important that the temperature of the heated surfaces within the vaporiser to which the air-fuel mixture is exposed should not be excessive and preferably should not rise substantially above 200° C. Consequently, the area ratio of the heat-transfer surfaces exposed to air-fuel mixture and exhaust gases respectively, i.e. the outer surface of the vaporiser tubes and attached fins, and the inner surface of the vaporiser tubes, respectively, should be sufficient to satisfy this condition. Area ratios of between 10:1 and 14:1 have been found acceptable.

The present invention provides an inexpensive and simple means of promoting increased efficiency of combustion of fuel supplied to a spark ignition engine.

We claim:

1. A self-regulating fuel vaporiser comprising a fuel-air conduit adapted for series connection between a carburetor and an inlet manifold of a spark ignition engine, and including a heat exchanger having a plurality of mutually parallel vaporiser tube transversely intersecting a region of said fuel-air conduit, and adapted in parallel flow arrangement for series connection with an exhaust conduit of said engine, a plurality of mutually parallel, planar vaporising fins disposed within said region of said fuel-air conduit in a direction normal to said vaporiser tubes, each fin occupying the full width of the surrounding conduit and each fin being intersected by and thermally coupled with every one of said vaporiser tubes, said region of said fuel-air conduit being additionally intersected by a thermally insulated exhaust by-pass tube arranged in parallel flow connection with said vaporiser tubes and transversely intersecting each of said vaporising fins.

2. A self-regulating fuel vaporiser as claimed in claim 1 wherein said vaporiser tubes and said by-pass tube are evenly spaced within said region of said fuel-air conduit in transverse rows, the tubes of each row being staggered with respect to those of each adjacent row.

3. A self-regulating fuel vaporiser as claimed in claim 1 wherein fuel-air pre-mixing means are located in said fuel-air conduit upstream of said heat exchanger.

4. A self-regulating fuel vaporiser as claimed in claim 3 wherein the pre-mixing means comprises at least one venturi constriction.

5. A self-regulating fuel vaporiser as claimed in claim 3 wherein said fuel-air pre-mixing means comprises a plurality of mutually parallel cylindrical members which longitudinally extend across the full width of said fuel-air conduit upstream of, and perpendicular to, said vaporiser tubes.

6. A self-regulating fuel vaporiser as claimed in claim 5 wherein said cylindrical members are evenly spaced in a plurality of transverse rows, the members of each row being staggered with respect to those of each adjacent row.

7. A self-regulating fuel vaporiser as claimed in claim 3 wherein said fuel-air pre-mixing means comprises a portion of said fuel-air conduit located upstream of said vaporising fins and having a smoothly reducing internal cross-section in the direction of flow, which cross-section abruptly expands adjacent said vaporising fins.

8. A self-regulating fuel vaporiser as claimed in claim 1 wherein said heat exchanger has a total external surface area at least ten times greater than its total internal surface area.

9. A self-regulating fuel vaporiser as claimed in claim 8 wherein said external surface area is between ten and fourteen times greater than said internal surface area.

10. A self-regulating fuel vaporiser as claimed in claim 1 wherein said region of said fuel-air conduit surrounding said heat exchanger has an outwardly tapering cross-section in the direction of fuel-air mixture flow.

11. A self-regulating fuel vaporiser comprising a fuel-air conduit adapted for series connection between a carburetor and an inlet manifold of a spark ignition engine, and including a heat exchanger having a plurality of mutually parallel, thermally conductive vaporiser tubes and at least one thermally insulated by-pass tube, all transversely intersecting a region of said fuel-air conduit, a first exhaust conduit arranged in series flow connection with one end of each of said vaporiser tubes and said by-pass tube, a second exhaust conduit arranged in series flow connection with the other end of each of said vaporiser tubes and said by-pass tube, said first and second exhaust conduits being adapted for connection between two consecutive portions of an exhaust pipe of said engine, and a plurality of mutually parallel, planar vaporising fins disposed within said region of said fuel-air conduit in a direction normal to said vaporiser tubes and said by-pass tube, each fin occupying the full width of the surrounding conduit and each being intersected by every one of said vaporiser tubes and said by-pass tube, and being thermally coupled with every one of said vaporiser tubes.

12. A self-regulating fuel vaporiser as claimed in claim 11 wherein said region of said fuel-air conduit surrounding said heat exchanger has an outwardly tapering cross-section in the direction of fuel-air mixture flow.

* * * * *